April 8, 1969 S. D. RYDSTEDT 3,437,029
PISTOL GRIP CARRYING STRAP
Filed Aug. 30, 1967
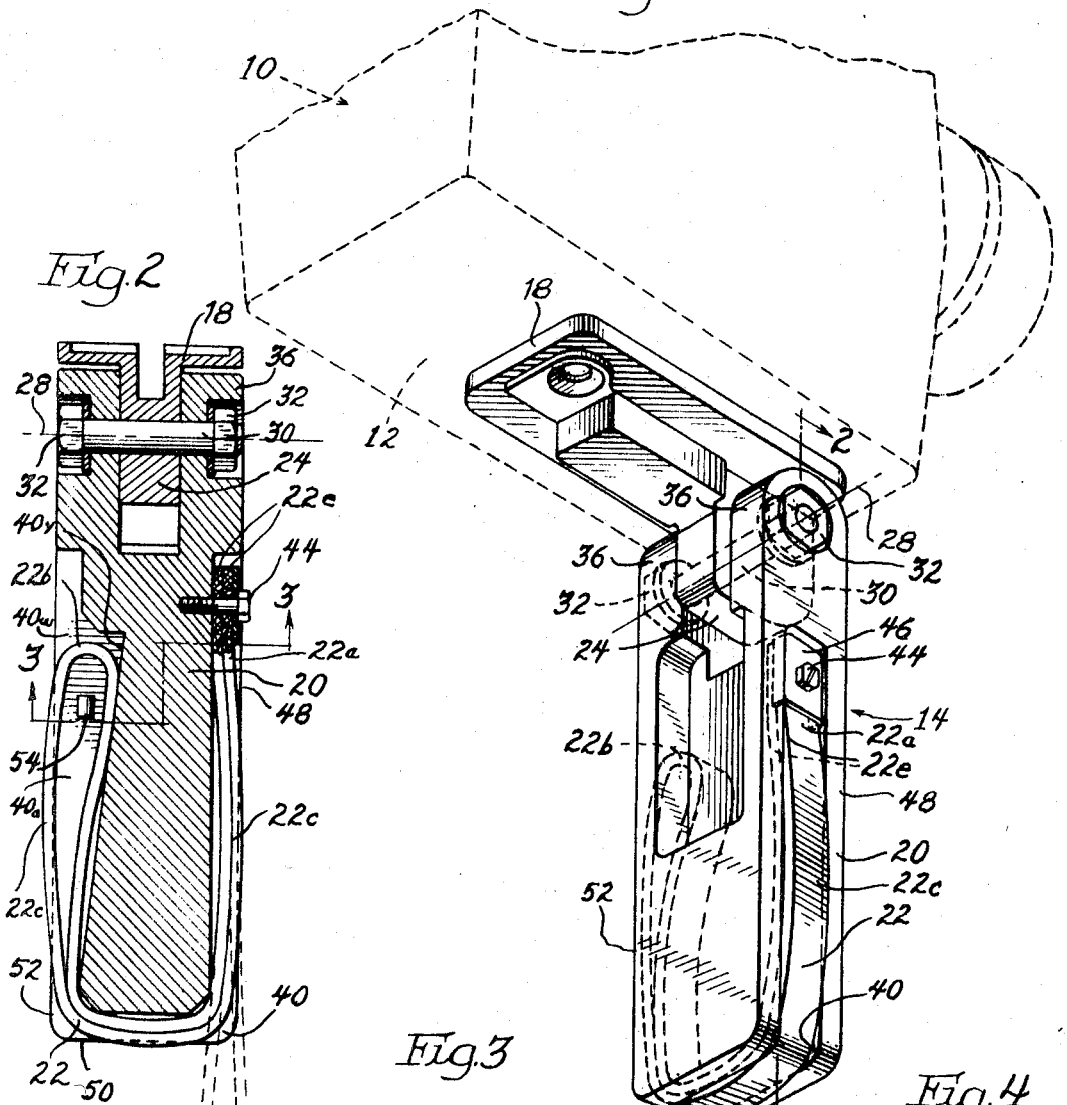
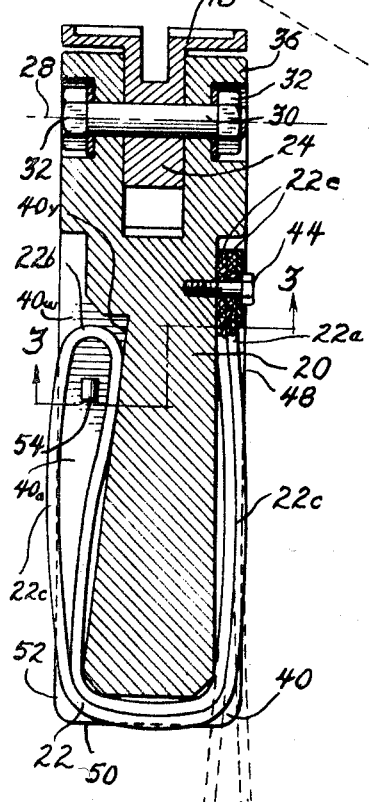
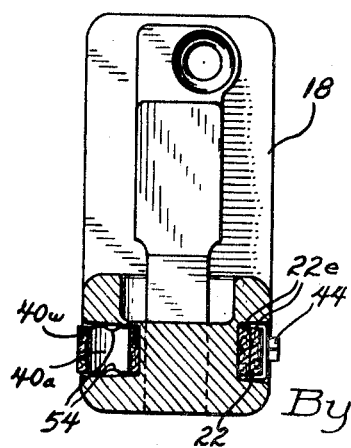
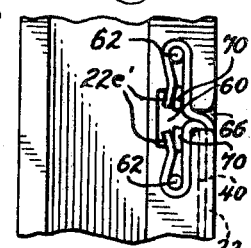
Inventor:
Simon D. Rydstedt.
By William J. Smith
John E. Pelle Jr. Attys.

United States Patent Office 3,437,029
Patented Apr. 8, 1969

3,437,029
PISTOL GRIP CARRYING STRAP
Simon D. Rydstedt, Lincolnwood, Ill., assignor to Bell & Howell Company, Chicago, Ill., a corporation of Illinois
Filed Aug. 30, 1967, Ser. No. 664,381
Int. Cl. G03b 17/56; B65d 71/00
U.S. Cl. 95—86
6 Claims

ABSTRACT OF THE DISCLOSURE

This camera supporting handle construction includes a rigid handle portion having a channel about its periphery in which a flexible handle portion or wrist strap can be stored, the wrist strap being nonremovably attached at one end of the channel and releasibly attachable by a retainer within the other end of the channel.

---

The present invention relates to a handle construction attachable to a camera including a rigid handle having a storable flexible handle attached thereto.

Background of the invention

In the past, rigid handles or grips have been provided on cameras to steady the camera in the hands of an operator when a tripod or other rigid support is not used. Generally, the operator places a hand about the grip to hold the camera securely in position during exposure. To some extent, this grip must be maintained so long as the operator carries the camera. Inadvertent relaxation of the grip could cause the dropping of the camera with resulting damage thereto. Alternatively, flexible handles or wrist straps have been provided for cameras whereby the strap is placed around the operator's wrist to secure the camera against accidental dropping. Such handles however, do not provide the desired rigidity to assist the operator in maintaining the camera steady while exposures are made.

A few cameras are provided with facilities for attaching simultaneously a rigid handle and a flexible handle. These handles provide the camera operator with the desired security from dropping, and the desired rigidity for holding the camera steady during exposures. Since the two handles take up extra space in storage however, one is often removed from the camera by the operator. For later use, only the handle remaining on the camera is used.

To overcome the shortcomings of known handle arrangements, the present rigid handle with facility therein for storage of a flexible handle is provided. Because both handles are at all times on the camera, the operator need only release the stored flexible handle from the rigid handle to use both. To return the camera to storage, the flexible handle is inserted into a channel about the rigid handle. In this manner only the space for the rigid handle is required. If use of the flexible handle is not desired, the rigid handle can be gripped with the flexible handle in stored position.

An object of the invention is to provide a rigid handle with a storage area therein in which a flexible handle or wrist strap can be removably stored.

Another object of the invention is to provide a flexible handle which is mounted in a rigid handle with an end of the flexible handle nonremovably attached, and the free end thereof removably attachable to the rigid handle.

Further and other objects will be apparent from the description of the accompanying drawings in which like numerals refer to like parts.

In the drawings:
FIG. 1 is a perspective view of the novel hand construction as it might be attached to a typical camera;
FIG. 2 is a sectional elevational view of the novel handle construction taken along line 2—2 of FIG. 1;
FIG. 3 is a plane view of the handle construction taken along line 3—3 of FIG. 2; and
FIG. 4 is a modification of the arrangement for attaching the flexible handle to the rigid handle.

The invention

Referring to FIG. 1, a camera 10 having a bottom surface 12 is shown. Attached to bottom surface 12 of camera 10 either by a screw (not shown) threaded into a tripod socket (not shown) or formed integrally therewith, is shown the novel handle construction 14 of the instant invention. Handle 14 is formed primarily of three portions, base plate portion 18 attached to or integral with the camera, rigid handle portion 20 pivotally movable relative to base plate portion 18, and elongated flexible handle portion 22 storable in rigid handle portion 20.

Base plate portion 18 includes an integrally formed lug portion 24 through which a pivot axis 28 is generated by conventional components, such as a shaft 30 threaded at both ends to receive nuts 32. Handle portion 20 is formed with shoulder portions 36, 36 through which pivot axis 28 passes to enable movement of this handle between an operative position as shown in FIG. 1, and a folded or storage position (not shown) wherein the handle is substantially parallel with base plate portion 18.

According to the instant invention, the rigid handle portion 20 of handle 14 is provided with a channel 40 in which a flexible handle or wrist strap 22 can be stored. The wrist strap may be formed of either natural materials, such as leather, or of synthetic materials, such as plastic. The strap is nevertheless formed of flexible material of a strength and thickness to support a camera from a user's wrist, should the user rely only on the wrist strap for camera support. In this preferred embodiment, the strap is formed as a strip, both ends of which are attached to rigid handle portion 20 by a fastening member 44 passing through the strips into the rigid material of the rigid handle portion 20. A clip 46 aids in securing the two ends of the strip to the rigid handle. To distinguish between the two ends of the flexible handle 22, the end non-removably attached to rigid handle 20 is identified as 22a and the loop or bent end removably attachable to the rigid handle as 22b.

To enable storage of flexible handle 22 in rigid handle portion 20, channel 40 is formed around most of the normally exposed peripheral edge portions 48, 50, 52 of rigid handle 20. As seen in FIG. 2, the depth of channel 40 along edge portions 48, 50 is selected in accordance with the double thickness of the flexible handle portions which will be stored in these channel portions. Thus, the strap in stored position extends only slightly beyond the exterior of edges 48 and 50, as indicated by slightly bowed portion 22c, seen in FIGS. 1 and 2. These bowed portions occur naturally in the strap because of the resistance of the construction material to bending around sharp corners.

Channel 40 in the remaining peripheral edge portion 52 of rigid handle portion 20 departs from the substantially constant depth of the channel in edge portions 48 and 50 to enable the bent end 22b of wrist strap 22 to be stored therein. As seen in FIG. 2, channel portion 40a increases in depth as the channel approaches that portion of edge 52 which is closest to pivot axis 28. The maximum channel depth is slightly greater than the bent end portion 22b of the wrist strap, thereby permitting this portion to be substantially stored within the handle portion without being unduly folded so as to possibly cause weakening of the strap. Channel portion 40a has oppositely facing wall surfaces 40w and an inner surface 40y. Integral with rigid handle portion 20, and extending from one surface, preferably a wall surface, is at least one wrist strap retaining rib 54. The inner portion of bent end 22b of strap 22 can be manually pushed inwardly of the rib, or ribs, for storage. Although this flexible handle has some yieldability, the degree of yieldability is insufficient to overcome the friction created by the retaining rib(s). Thus, the strap remains in stored position until intentionally removed.

To remove the strap, the user will find it necessary only to push his finger, or a small elongated item, such as a pencil, into deepened channel portion 40a to urge the flexible handle portion outwardly of the channel beyond rib 54. The flexible handle then is free of channel 40 in the position as disclosed in dashed lines in FIG. 2. In this latter position of the flexible handle, the user can pass his hand through the loop and grip the rigid handle, thereby attaining the ability to handle the camera in such manner as to reduce undesired movement of the camera. At the same time, the wrist strap prevents inadvertent dropping of the camera.

Referring now to FIG. 4, another manner of retaining flexible handle 22 in the channel 40 of rigid handle 20 is shown. In this modification, rigid handle 20 is made in front and back sections, only the inner surface of the front section being shown. A recess 60 is formed at an end of channel 40 by molding or another known process. Within the recess, a pair of pins 62, 62 remain standing integral with the rigid handle portion. The ends 22e', 22e' of flexible handle 22 are located in recess 60 deformed about the pins 62 so as to over-lap with the portion of the flexible handle near an outwardly opening throat 66 of recess 60. A pair of lock-wedges 70 are formed in the not shown back section of handle portion 20, and are movable between the ends 22e', 22e' and adjacent strap portions when the two sections of handle portion 20 are brought together. These lock-wedge portions 70 wedge the flexible handle within the recess in a manner so as to make it substantially nonremovable in normal use.

What is claimed is:
1. A handle construction adapted for attachment to a camera, said construction including a rigid handle portion having an exposed periphery, the construction comprising:
   a channel extending substantially about the exposed periphery of the rigid handle portion; a flexible elongated handle portion nonremovably attached to said rigid handle portion within said channel near one end thereof; and flexible handle retaining means in said rigid handle portion near the other end of said channel, whereby said flexible handle portion is removably storable in said channel.

2. A handle construction as in claim 1, wherein said flexible elongated handle portion is storable substantially within said channel.

3. A handle construction as in claim 1, wherein said flexible handle retaining means is a rib extending into said channel to frictionally restrain said flexible handle portion therein.

4. A handle construction as in claim 1, wherein said channel includes opposing surfaces and said flexible handle retaining means is a rib extending into said channel from one of said opposing surfaces wherein said rib releasably retains said flexible handle in said channel.

5. A handle construction as in claim 4, wherein said channel includes an enlarged portion adjacent said rib permiting extraction of the free end of said flexible handle portion from said channel of said rigid handle portion.

6. A handle construction as in claim 1, wherein said elongated flexible handle portion is of a length to extend in said channel beyond said retaining lug when said flexible handle portion is in storage condition.

References Cited
UNITED STATES PATENTS 2,313,593  3/1943  Smith _____ 224—5

FOREIGN PATENTS 912,577  12/1962  Great Britain.

GERALD M. FORLENZA, *Primary Examiner.*

RAYMOND B. JOHNSON, *Assistant Examiner.*

U.S. Cl. X.R.

224—45